US012367732B2

(12) United States Patent
Peters et al.

(10) Patent No.: US 12,367,732 B2
(45) Date of Patent: *Jul. 22, 2025

(54) APPARATUS FOR CONTROLLING ACCESS TO AND USE OF PORTABLE ELECTRONIC DEVICES

(71) Applicant: Renovo Software, Inc., Reston, VA (US)

(72) Inventors: Brian Peters, Crystal, MN (US); Timothy J. Eickhoff, Edina, MN (US); Ehren R. Jarosek, Eagan, MN (US); Tim Skaja, Maple Grove, MN (US)

(73) Assignee: Renovo Software, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,601

(22) Filed: Feb. 13, 2024

(65) Prior Publication Data

US 2024/0265764 A1    Aug. 8, 2024

Related U.S. Application Data

(60) Continuation of application No. 17/816,584, filed on Aug. 1, 2022, now Pat. No. 11,935,353, which is a
(Continued)

(51) Int. Cl.
*G07F 17/00* (2006.01)
*G06F 16/23* (2019.01)
(Continued)

(52) U.S. Cl.
CPC .......... *G07F 17/00* (2013.01); *G06F 16/2358* (2019.01); *G06Q 20/145* (2013.01);
(Continued)

(58) Field of Classification Search
CPC .... G07F 17/00; G07F 17/0042; G07F 17/005; G07F 9/001; G07F 17/12; G07F 17/10;
(Continued)

(56) References Cited

U.S. PATENT DOCUMENTS 3,836,755 A    9/1974 Ehrat
4,108,363 A    8/1978 Susumu
(Continued)

FOREIGN PATENT DOCUMENTS

EP    0159359 A1    10/1985
EP    0239110 A2    9/1987
(Continued)

OTHER PUBLICATIONS

Controlling Wireless Abuse in Restricted Areas, Cell Block Technologies Inc, www.cell-block-r.com, 1-7, Prison Review International, (Apr. 2002).
(Continued)

*Primary Examiner* — Curtis J King
(74) *Attorney, Agent, or Firm* — Sterne, Kessler, Goldstein & Fox P.L.L.C.

(57) ABSTRACT

Various prison services are rendered more efficient by providing inmates access to portable electronic devices in a controlled and regulated manner. A dispenser is employed to control and monitor the checking out and return of portable electronic devices and to communicate with such devices during use by inmates to monitor inmate use and ensure the portable electronic devices are only used by inmates as authorized.

20 Claims, 11 Drawing Sheets

Related U.S. Application Data continuation of application No. 17/175,493, filed on Feb. 12, 2021, now Pat. No. 11,403,908, which is a continuation of application No. 16/403,787, filed on May 6, 2019, now Pat. No. 10,922,915, which is a continuation of application No. 15/682,107, filed on Aug. 21, 2017, now Pat. No. 10,282,935, which is a division of application No. 15/188,592, filed on Jun. 21, 2016, now Pat. No. 9,786,114, which is a continuation of application No. 14/030,451, filed on Sep. 18, 2013, now Pat. No. 9,508,212.

(51) Int. Cl.
| | |
|---|---|
| G06Q 20/14 | (2012.01) |
| G06Q 20/40 | (2012.01) |
| G06Q 50/26 | (2012.01) |
| G07C 9/20 | (2020.01) |
| H04L 9/40 | (2022.01) |

(52) U.S. Cl.
CPC ............ *G06Q 20/405* (2013.01); *G06Q 50/26* (2013.01); *G07C 9/20* (2020.01); *G07F 17/0042* (2013.01); *G07F 17/005* (2013.01); *H04L 63/083* (2013.01)

(58) Field of Classification Search
CPC ............ G07F 17/0014; G06F 16/2358; G06Q 20/145; G06Q 20/405; G06Q 50/26; G06Q 30/0645; G06Q 20/18; G06Q 10/20; G07C 9/20; H04L 63/083
See application file for complete search history.

(56) References Cited

U.S. PATENT DOCUMENTS

| | | | |
|---|---|---|---|
| 4,136,764 A | 1/1979 | Johnson | |
| 4,598,810 A | 7/1986 | Shore et al. | |
| 4,734,005 A * | 3/1988 | Blumberg | B65G 1/0435 414/280 |
| 4,866,661 A | 9/1989 | De Prins | |
| 4,871,054 A | 10/1989 | Murray | |
| 4,893,705 A | 1/1990 | Brown | |
| 4,896,024 A | 1/1990 | Morello et al. | |
| 4,915,205 A | 4/1990 | Reid et al. | |
| 4,951,308 A * | 8/1990 | Bishop | G07F 7/06 379/91.01 |
| 4,967,906 A | 11/1990 | Morello et al. | |
| 5,025,950 A | 6/1991 | Trouteaud et al. | |
| 5,028,766 A | 7/1991 | Shah | |
| 5,133,441 A | 7/1992 | Brown | |
| 5,172,829 A | 12/1992 | Dellicker | |
| 5,205,436 A * | 4/1993 | Savage | G07F 7/06 221/75 |
| 5,285,382 A | 2/1994 | Muehlberger et al. | |
| 5,386,462 A | 1/1995 | Schlamp | |
| 5,678,200 A | 10/1997 | Levi | |
| 5,744,933 A | 4/1998 | Inoue et al. | |
| 5,812,641 A | 9/1998 | Kanoh et al. | |
| 5,819,981 A * | 10/1998 | Cox | G07F 17/12 221/5 |
| 5,940,764 A | 8/1999 | Mikami | |
| 6,154,006 A * | 11/2000 | Hatanaka | B60L 53/305 320/109 |
| 6,201,973 B1 | 3/2001 | Kowaguchi | |
| 6,439,272 B1 | 8/2002 | Wertheim | |
| 6,496,703 B1 | 12/2002 | Da Silva | |
| 6,763,370 B1 * | 7/2004 | Schmeidler | G06Q 30/06 348/E7.071 |
| 6,799,052 B2 | 9/2004 | Agness et al. | |
| 6,799,084 B2 | 9/2004 | Grobler | |
| 6,830,160 B2 | 12/2004 | Risolia | |
| 6,866,193 B1 | 3/2005 | Shimizu et al. | |
| 6,880,754 B1 | 4/2005 | Lie-Nielsen et al. | |
| 6,896,145 B2 | 5/2005 | Higgins et al. | |
| 6,975,941 B1 | 12/2005 | Lau et al. | |
| 7,142,108 B2 | 11/2006 | Diener et al. | |
| 7,233,916 B2 | 6/2007 | Schultz | |
| 7,756,604 B1 * | 7/2010 | Davis | G06Q 20/342 700/240 |
| 7,861,927 B2 | 1/2011 | Degironemo | |
| 8,019,354 B2 | 9/2011 | Rae et al. | |
| 8,078,190 B2 | 12/2011 | Noonan et al. | |
| 8,099,080 B1 | 1/2012 | Rae et al. | |
| 8,106,752 B2 | 1/2012 | Golden | |
| 8,175,577 B1 | 5/2012 | Harvey et al. | |
| 8,233,880 B2 | 7/2012 | Johnson | |
| 8,238,936 B2 | 8/2012 | Nadler et al. | |
| 8,239,262 B2 | 8/2012 | Bowles et al. | |
| 8,248,238 B2 | 8/2012 | Butler et al. | |
| 8,254,886 B2 | 8/2012 | Salkini et al. | |
| 8,311,892 B2 | 11/2012 | Junger | |
| 8,346,281 B2 | 1/2013 | Noonan et al. | |
| 8,365,868 B2 | 2/2013 | Johnson et al. | |
| 8,421,630 B2 | 4/2013 | Butler et al. | |
| 8,498,937 B1 | 7/2013 | Shipman et al. | |
| 8,509,740 B2 | 8/2013 | Salkini et al. | |
| 8,509,818 B2 | 8/2013 | Schork et al. | |
| 8,583,078 B2 | 11/2013 | Sweeney et al. | |
| 8,606,229 B2 | 12/2013 | Johnson | |
| 8,626,195 B2 | 1/2014 | Noonan et al. | |
| 8,750,903 B1 | 6/2014 | Fitzsimmons et al. | |
| 8,825,011 B2 | 9/2014 | Salkini et al. | |
| 8,981,925 B2 | 3/2015 | Chapin et al. | |
| 8,983,446 B2 | 3/2015 | Nadler et al. | |
| 9,295,071 B2 | 3/2016 | Salkini et al. | |
| 9,301,102 B2 | 3/2016 | Noonan et al. | |
| 9,313,639 B2 | 4/2016 | Salkini et al. | |
| 9,332,412 B2 | 5/2016 | Salkini et al. | |
| 9,332,520 B2 | 5/2016 | Nadler et al. | |
| 9,355,515 B2 | 5/2016 | Brahami et al. | |
| 9,508,212 B2 | 11/2016 | Peters et al. | |
| 9,584,252 B1 | 2/2017 | Salyers et al. | |
| 9,681,360 B1 | 6/2017 | Salyers et al. | |
| 9,786,114 B2 | 10/2017 | Peters et al. | |
| 10,217,311 B2 | 2/2019 | Peters et al. | |
| 10,282,935 B2 | 5/2019 | Peters et al. | |
| 10,346,819 B2 | 7/2019 | Stock et al. | |
| 10,922,915 B2 | 2/2021 | Peters et al. | |
| 2001/0036821 A1 | 11/2001 | Gainsboro et al. | |
| 2001/0041987 A1 | 11/2001 | Ichikawa | |
| 2002/0004690 A1 | 1/2002 | Paulucci et al. | |
| 2002/0036995 A1 | 3/2002 | Dalsgaard | |
| 2002/0094780 A1 | 7/2002 | Payton et al. | |
| 2002/0113075 A1 | 8/2002 | Chirnomas | |
| 2002/0116208 A1 | 8/2002 | Chirnomas | |
| 2003/0001466 A1 * | 1/2003 | Herrington | G07F 11/62 312/215 |
| 2003/0017821 A1 | 1/2003 | Irvin | |
| 2003/0030539 A1 | 2/2003 | McGarry et al. | |
| 2003/0143943 A1 | 7/2003 | Kline | |
| 2004/0016620 A1 * | 1/2004 | Davis | G07F 7/069 194/205 |
| 2004/0044697 A1 | 3/2004 | Nixon | |
| 2004/0160304 A1 * | 8/2004 | Mosgrove | G07C 9/27 713/193 |
| 2004/0164847 A1 * | 8/2004 | Hale | G06Q 20/12 340/5.28 |
| 2004/0186620 A1 | 9/2004 | Chirnomas | |
| 2005/0060246 A1 | 3/2005 | Lastinger et al. | |
| 2005/0211768 A1 | 9/2005 | Stillman | |
| 2006/0079218 A1 | 4/2006 | Aldridge et al. | |
| 2006/0165217 A1 | 7/2006 | Skatter | |
| 2006/0276933 A1 * | 12/2006 | Chavez | G06Q 10/087 700/214 |
| 2007/0041545 A1 | 2/2007 | Gainsboro | |
| 2007/0041581 A1 | 2/2007 | Frost | |
| 2007/0050271 A1 | 3/2007 | Ufford et al. | |
| 2007/0159991 A1 | 7/2007 | Noonan et al. | |
| 2008/0005225 A1 | 1/2008 | Ferguson et al. | |
| 2008/0057976 A1 | 3/2008 | Rae et al. | |

(56) References Cited

U.S. PATENT DOCUMENTS

| | | | |
|---|---|---|---|
| 2008/0058985 A1* | 3/2008 | Alcov | G07F 7/00 |
| | | | 700/234 |
| 2008/0111691 A1* | 5/2008 | Lee | G06K 17/00 |
| | | | 340/572.1 |
| 2008/0168515 A1 | 7/2008 | Benson et al. | |
| 2008/0252414 A1 | 10/2008 | Crigger et al. | |
| 2010/0105416 A1 | 4/2010 | Nadler et al. | |
| 2010/0125362 A1* | 5/2010 | Canora | G06Q 20/327 |
| | | | 235/487 |
| 2010/0151820 A1 | 6/2010 | Mulherin et al. | |
| 2010/0268379 A1* | 10/2010 | Woodard | G06Q 10/00 |
| | | | 700/237 |
| 2011/0053640 A1 | 3/2011 | Bennett et al. | |
| 2011/0093622 A1 | 4/2011 | Hahn et al. | |
| 2011/0119417 A1 | 5/2011 | Tseng et al. | |
| 2011/0258135 A1 | 10/2011 | Paul et al. | |
| 2011/0259907 A1 | 10/2011 | Kuma | |
| 2011/0301749 A1 | 12/2011 | Hammonds et al. | |
| 2011/0313937 A1 | 12/2011 | Moore et al. | |
| 2012/0011366 A1* | 1/2012 | Denison | G07C 9/00571 |
| | | | 707/812 |
| 2012/0016518 A1 | 1/2012 | Saario et al. | |
| 2012/0078413 A1 | 3/2012 | Baker | |
| 2012/0189110 A1 | 7/2012 | Bullard et al. | |
| 2012/0200385 A1 | 8/2012 | Savage et al. | |
| 2012/0215347 A1 | 8/2012 | Illingworth et al. | |
| 2012/0248183 A1* | 10/2012 | Cook | G07F 17/0042 |
| | | | 235/381 |
| 2012/0254303 A1* | 10/2012 | Anbalagan | G06Q 50/01 |
| | | | 709/204 |
| 2012/0254304 A1* | 10/2012 | Anbalagan | H04L 51/52 |
| | | | 709/204 |
| 2012/0295646 A1 | 11/2012 | Johnson | |
| 2013/0027183 A1 | 1/2013 | Wu et al. | |
| 2013/0036018 A1 | 2/2013 | Dickerson | |
| 2013/0112702 A1 | 5/2013 | Roekens et al. | |
| 2013/0307533 A1 | 11/2013 | Keene et al. | |
| 2014/0018059 A1 | 1/2014 | Noonan | |
| 2014/0066012 A1 | 3/2014 | Sweeney et al. | |
| 2014/0120827 A1 | 5/2014 | Johnson | |
| 2014/0128023 A1* | 5/2014 | Guerra | G07F 11/54 |
| | | | 455/406 |
| 2014/0143161 A1* | 5/2014 | Ahn | G06Q 50/26 |
| | | | 705/308 |
| 2014/0148947 A1 | 5/2014 | Levesque et al. | |
| 2014/0194084 A1 | 7/2014 | Noonan et al. | |
| 2014/0218466 A1 | 8/2014 | Bloms et al. | |
| 2014/0219432 A1 | 8/2014 | Bengston et al. | |
| 2014/0253322 A1 | 9/2014 | Chapin et al. | |
| 2014/0297487 A1 | 10/2014 | Bashkin | |
| 2014/0330682 A1 | 11/2014 | Knight | |
| 2014/0333761 A1 | 11/2014 | Porter | |
| 2014/0343719 A1 | 11/2014 | Collombet et al. | |
| 2014/0344116 A1 | 11/2014 | Paracha et al. | |
| 2014/0367466 A1 | 12/2014 | Pai et al. | |
| 2015/0054639 A1 | 2/2015 | Rosen | |
| 2015/0077221 A1 | 3/2015 | Peters et al. | |
| 2015/0079935 A1 | 3/2015 | Maguire et al. | |
| 2015/0115029 A1 | 4/2015 | Rahim et al. | |
| 2015/0279147 A1 | 10/2015 | Illingworth et al. | |
| 2015/0314246 A1* | 11/2015 | Lehtonen | B01F 35/2206 |
| | | | 700/265 |
| 2015/0356801 A1* | 12/2015 | Nitu | G07C 9/00904 |
| | | | 340/5.61 |
| 2015/0363749 A1* | 12/2015 | Buscher | G07F 7/06 |
| | | | 705/305 |
| 2016/0006922 A1 | 1/2016 | Boudreau et al. | |
| 2016/0019741 A1 | 1/2016 | Dua et al. | |
| 2016/0071052 A1 | 3/2016 | Henry et al. | |
| 2016/0099590 A1 | 4/2016 | Velderman et al. | |
| 2016/0180632 A1 | 6/2016 | Santana et al. | |
| 2016/0300409 A1 | 10/2016 | Peters et al. | |
| 2016/0314514 A1 | 10/2016 | High et al. | |
| 2016/0328979 A1 | 11/2016 | Postrel | |
| 2016/0379287 A1 | 12/2016 | Dabiri | |
| 2017/0061560 A1 | 3/2017 | Bullard et al. | |
| 2017/0094521 A1 | 3/2017 | Salyers et al. | |
| 2017/0094534 A1 | 3/2017 | Salyers et al. | |
| 2017/0148001 A1 | 5/2017 | Stock et al. | |
| 2017/0261604 A1 | 9/2017 | Van Voorst | |
| 2017/0286649 A1 | 10/2017 | Lowenthal et al. | |
| 2017/0287295 A1 | 10/2017 | Aswath et al. | |
| 2017/0345248 A1 | 11/2017 | Peters et al. | |
| 2017/0358169 A1 | 12/2017 | Peters et al. | |
| 2019/0362586 A1 | 11/2019 | Peters et al. | |
| 2021/0272412 A1 | 9/2021 | Peters et al. | |

FOREIGN PATENT DOCUMENTS

| | | | |
|---|---|---|---|
| EP | 2328130 A1 | 6/2011 | |
| WO | WO2007137067 A2 | 11/2007 | |
| WO | WO2008073566 A2 | 6/2008 | |
| WO | WO2012174324 A1 | 12/2012 | |

OTHER PUBLICATIONS

Xu, W., et al., "The Feasibility of Launching and Detecting Jamming Attacks in Wireless Networks," Mobile ad hoc networking and computing 46-57, (May 2005).

No More 'Cell' Phones, TECH beat, 1-2, Winter, (2005).

Cellbuster Cell Phone Detector, Cellbusters Mobile Security Products, Cellbusters.Com, 1-2, Phoenix, Arizona, available (Aug. 16, 2006).

Efstathiou E.C., et al., "The Mobile-Phone Silencers Controversy," Athens Athens University of Economics and Business, Department of Computer Science, 1-4, Mobile Multimedia Library, (Jan. 2002).

Excerpts from the Prosecution History of U.S. Appl. No. 11/504,979, filed Aug. 16, 2006,.

Excerpts from the Prosecution History of U.S. Patent Application No. 13/562.057, filed Jul. 30, 2012.

GSM Pocket Cellular Phone Detector, www.cellular.co.za, 1 page, accessed Oct. 6, 2005.

International Search Report and Written Opinion for International Application No. PCT/US2017/054974 mailed Oct. 19, 2017, 9 pages.

U.S. Appl. No. 60/602,838, filed Aug. 19, 2004.

Final Office Action Mailed on Dec. 30, 2016, in U.S. Appl. No. 15/188,592, dated Aug. 21, 2017, 6 pages.

Non-Final Office Action Mailed on Apr. 28, 2017 for U.S. Appl. No. 15/188,592, filed Aug. 21, 2017, 13 pages.

Non-Final Office Action Mailed on Sep. 9, 2016 for U.S. Appl. No. 15/188,592, filed Aug. 21, 2017, 5 pages.

Notice of Allowance Mailed on Feb. 24, 2016 for U.S. Appl. No. 14/030,451, filed Aug. 21, 2017, 8 pages.

Notice of Allowance Mailed on Jul. 12, 2016 for U.S. Appl. No. 14/030,451, filed Aug. 21, 2017, 7 pages.

Notice of Allowance Mailed on Oct. 31, 2016 for U.S. Appl. No. 14/030,451, filed Aug. 21, 2017, 2 pages.

Notice of Allowance Mailed on Aug. 9, 2017 for U.S. Appl. No. 15/188,592, filed Aug. 21, 2017, 7 pages.

International Search Report and Written Opinion for International Application No. PCT/US2017/046596, mailed on Dec. 7, 2017, 12 pages.

International Search Report and Written Opinion for International Application No. PCT/US2017/066248, mailed on Apr. 12, 2018, 12 pages.

* cited by examiner

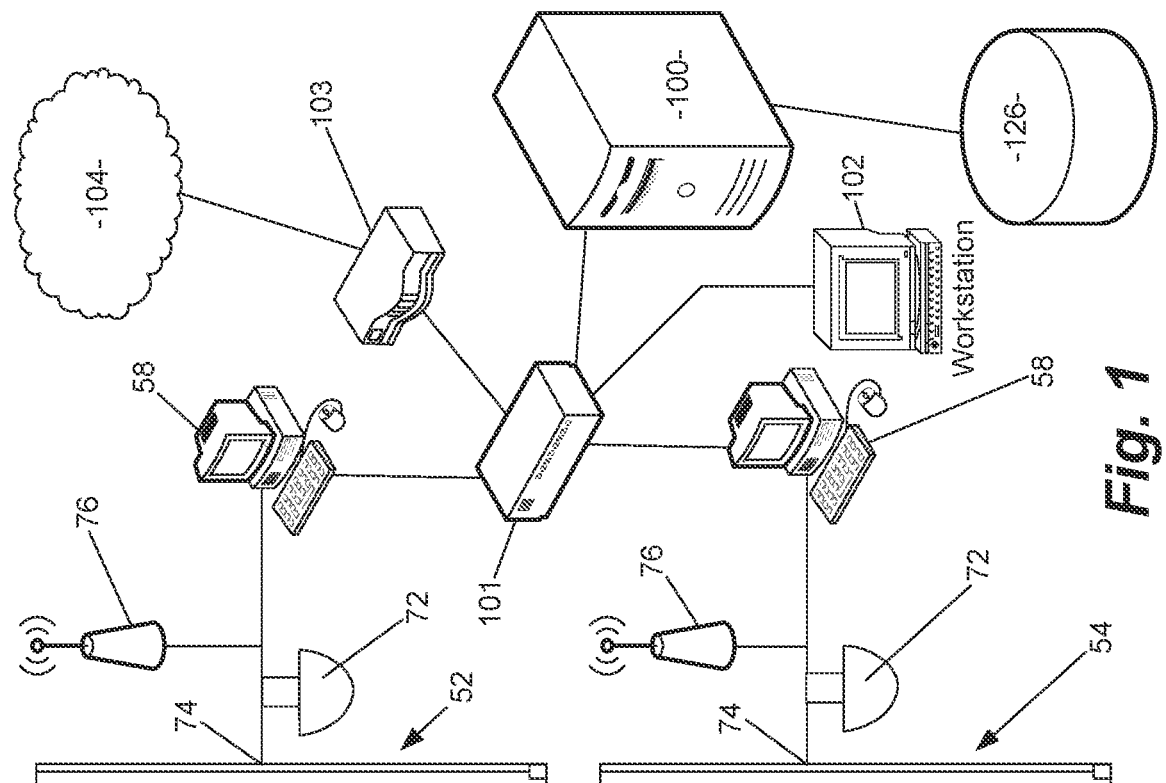
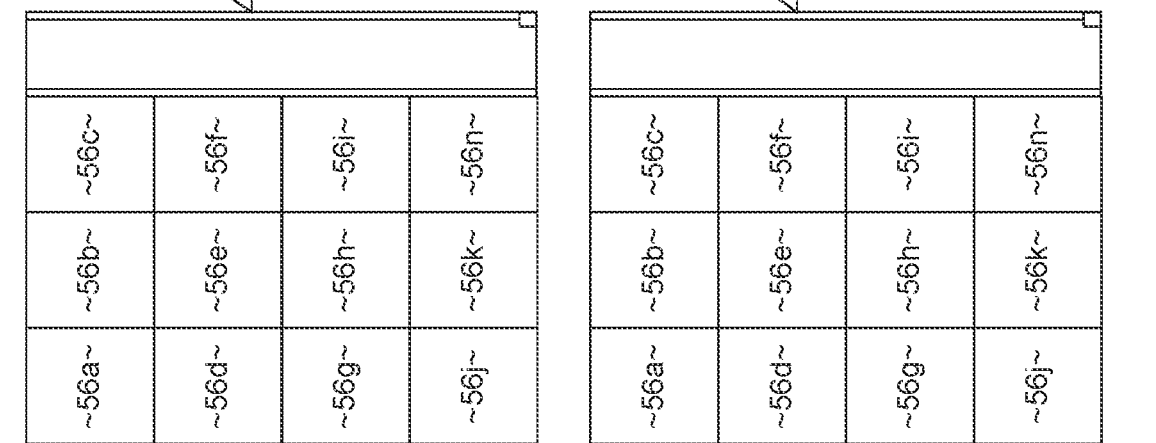
Fig. 1

APPARATUS FOR CONTROLLING ACCESS TO AND USE OF PORTABLE ELECTRONIC DEVICES

CROSS-REFERENCED TO RELATED APPLICATIONS

This application is a continuation of U.S. patent application Ser. No. 17/816,584, filed Aug. 1, 2022, which is a continuation of U.S. patent application Ser. No. 17/175,493, filed Feb. 12, 2021, now U.S. Pat. No. 11,403,908, which is a continuation of U.S. patent application Ser. No. 16/403,787, filed May 6, 2019, now U.S. Pat. No. 10,922,915, which is a continuation of U.S. patent application Ser. No. 15/682,107, filed Aug. 21, 2017, now U.S. Pat. No. 10,282,935, which is a divisional of U.S. patent application Ser. No. 15/188,592, filed Jun. 21, 2016, now U.S. Pat. No. 9,786,114, which is a continuation of U.S. patent application Ser. No. 14/030,451, filed Sep. 18, 2013, now U.S. Pat. No. 9,508,212, all of which are incorporated by reference in their entireties.

BACKGROUND

I. Field

The present invention concerns the management of jails, prisons and other penal institutions. More particularly, this invention relates to a system for providing prisoners with controlled access to portable electronic devices such as laptop computers, tablet computers and wireless communication devices such as cellular telephones.

II. Related Art

A modern penal institution typically provides a collection of services to the inmate population. These services include, by way of example, library services, video entertainment services, computing services, grievance services, commissary services, and telephone and video chat communication services. The library services typically include access to legal publications, and educational and training publications. The video entertainment services include access to certain movies, television programs and video games. Computing services include access to computer resources such as word processing and e-mail programs for communicating with lawyers or family members. The computing services also allow other documents to be prepared and stored by prisoners. Modern penal institutions also typically afford a prisoner the opportunity to register grievances if the prisoner believes he or she is being mistreated. Since prisoners are not free to shop, most penal institutions operate a commissary where prisoners can purchase a variety of personal convenience items such as a toothbrush, toothpaste, soaps and shampoos, snacks, magazines, playing cards or the like. Prisoners are also given opportunities to communicate with their family members and lawyers using telephone or video conferencing technology. All of these services must be provided in a controlled fashion to maintain security and prevent abuse.

Heretofore, integrated systems for providing all of the foregoing services and others have been non-existent. Prisons have typically operated and managed a separate system for each service leading to inefficient use of resources, ineffective delivery of service and increased costs. The present invention uses portable electronic devices to provide a fully integrated system for providing such services which overcomes all of these disadvantages while at the same time offering the control and security desperately needed in a prison environment. In fact, the present invention is so agile that it enables differing security measures to be employed for different penal institutions, different groups of inmates in a particular penal institution and even individual prisoners.

SUMMARY

A plurality of portable electronic devices is provided. By way of example and without limitation, such portable electronic devices may include laptop computers, tablet computers, personal digital assistants, iPod$^G$ players made by Apple Computer, Inc. or similar media-playing devices, cell phones, smartphones or other wireless communication devices. Each portable electronic device comprises a user interface, a processor, memory, a battery and a two-way wireless communicator. Again by way of example and without limitation, the two-way wireless communicators may be any short-range, two-way communications device such as the Wi-Fi and Bluetooth communicators typically found in today's portable electronic devices. Each portable electronic device is also equipped with an identification tag such as a bar code or radio frequency identification (RFID) tag. The identification tag can also be a coded identification signal periodically transmitted via the wireless communicator of the portable electronic device.

Inmate access to the portable electronic devices is controlled using at least one dispensing unit. The dispensing unit has a wireless communications unit for two-way communications with the two-way wireless communicators of the portable electronic devices. Thus, media, programs, files and other data can be transferred between the dispensing unit and the portable electronic devices. The dispensing unit also has a graphical user interface and an alarm.

Additionally, the dispensing unit has a plurality of storage compartments. Typically, a specific portable electronic device will be assigned to a specific storage compartment. To control access, each compartment has a door, an electronic lock and a door sensor for sensing the position of the door. To ensure an assigned portable electronic device, and only the assigned portable electronic device, is positioned within a compartment, three separate sensors are employed. These include a light sensor which may be a camera or electric eye, a weight sensor, and an identification sensor which reads the identification tag of the portable electronic device. The alarm of the dispenser will be actuated if any other object is placed in the compartment. The compartment is also equipped with a data/power port for charging the battery of the portable electronic device when positioned within the compartment and for transferring data between the portable electronic device and the dispensing unit. One or more status indicators may be employed to provide an indication of the status of the door and lock, the presence or absence of a portable electronic device within the compartment, the charge state of the battery of the portable electronic device, and whether the portable electronic device has completed a set-up process, such as an inmate specific set-up process, and is available for use by that inmate.

Operation of the portable electronic devices and dispensing units are controlled using a server coupled to the dispensing units, at least one administrative workstation, and a relational database. The server is operated under program control based upon inputs received from the database and administrative workstation. Likewise, the server is used to provide various status reports to the administrative workstation and update the database in response to signals received from the portable electronic devices, the dispensers, and the administrative workstations. As explained more fully below, the database is a relational database storing data related to prisoner identity, prisoner accounts, prisoner rights, prisoner schedules, files and folders accessible by prisoners, and usage by prisoners. The database also includes data concerning the identity, attributes and status of the dispensing units, portable electronic devices, groups of prisoners and the individual prisoners.

BRIEF DESCRIPTION OF THE DRAWINGS

The foregoing features, objects and advantages will become apparent to those skilled in the art from the following detailed description and with reference to the following drawings in which like numerals in the several views refer to corresponding parts.

FIG. 1 is a schematic diagram illustrating an apparatus for controlling access to and use of portable electronic devices.

DETAILED DESCRIPTION

Figure 2:
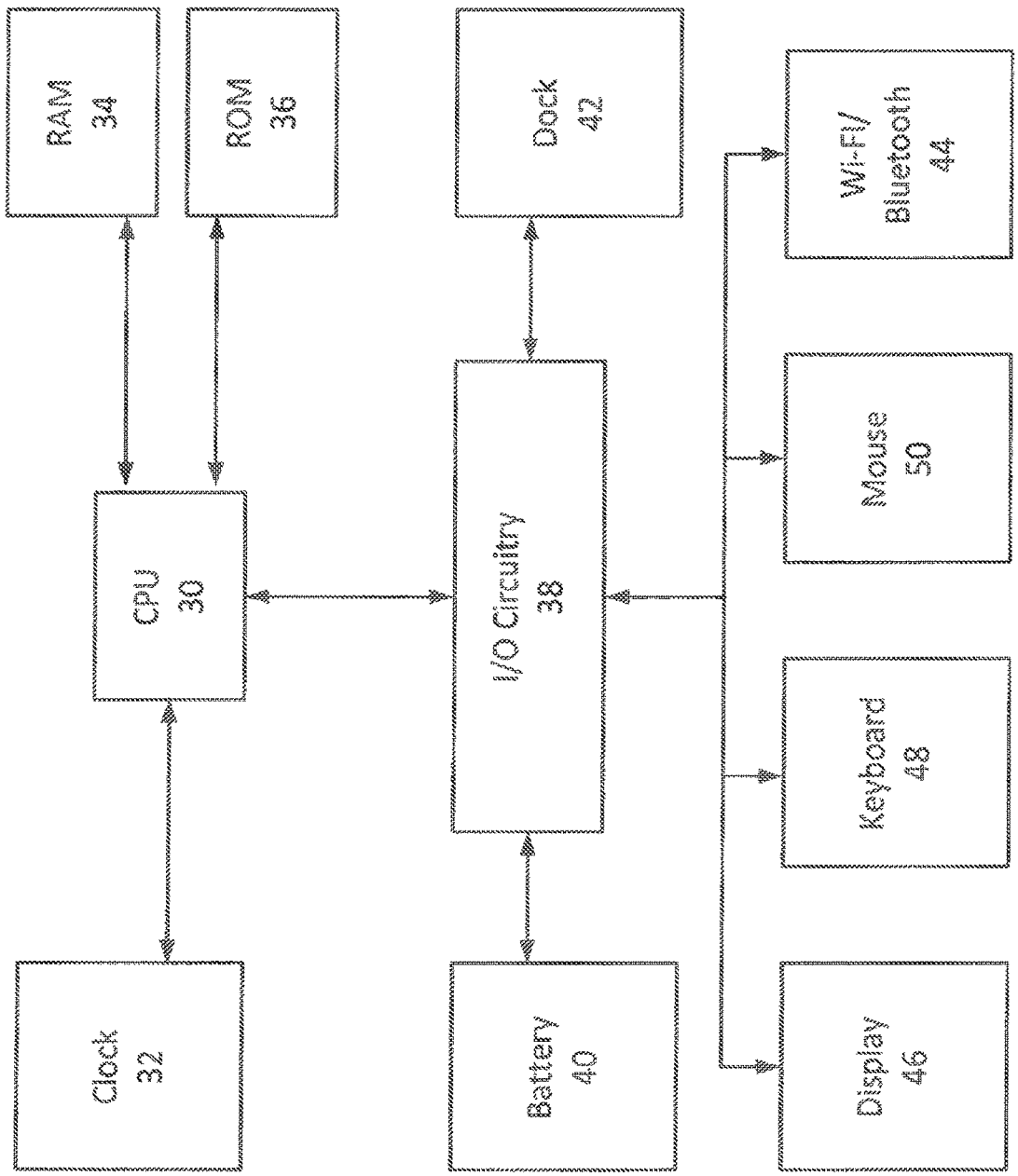
FIG. 2 is a schematic diagram of a portable electronic device of FIG. 1.

This description of the preferred embodiment is intended to be read in connection with the accompanying drawings, which are to be considered part of the entire written description. In the description, relative terms such as lower, upper, horizontal, vertical, above, below, up, down, top, and bottom as well as derivatives thereof (e.g., horizontally, downwardly, upwardly, etc.) should be construed to refer to the orientation as then described or shown in the drawings under discussion. These relative terms are employed for convenience of description and do not require that the apparatus be constructed or operated in a particular orientation. Terms such as connected, connecting, attached, attaching, join and joining are used interchangeably and refer to one structure of surface being secured directly or indirectly to another structure or surface or integrally fabricated in one piece, unless expressly described otherwise.

FIG. 1 shows, toward the left, a plurality of portable electronic devices. Devices 10 and 12 represent tablet computers or personal digital assistants. Devices 14 and 16 represent cell phones, smartphones and other wireless telephones. Devices 18 and 20 represent laptop computers. Other portable electronic devices may be employed. Coupled to each portable electronic device is an identification tag such as an RFID tag 22 which uniquely identifies the portable electronic device. In lieu of an RFID tag 22, other electronically readable tags may be employed, such as a bar code. Alternatively, the portable electronic device may be programmed to periodically transmit an identification signal.

FIG. 2 shows a generic schematic diagram of a portable electronic device having features typically common to portable electronic devices 10-20 or any other portable electronic device which might be used. As illustrated, the portable electronic devices each include a processor or central processing unit (CPU) 30 coupled to a clock 32, random access memory (RAM) 34, read-only memory (ROM) 36 and input-output (I/O) circuitry 38. In turn, the I/O circuitry is coupled to a rechargeable battery which supplies power to the portable electronic device and docking circuitry 42 for charging the battery and transferring data, programs and files to and from the portable electronic device. Data programs and files may also be transferred to and from the personal electronic device via a two-way wireless communicator 44 which communicates using either Wi-Fi and/or Bluetooth protocols. Other communications protocols may also be employed by the wireless communicator 44. Finally, the portable electronic device has a user interface which may include a display 46, a keyboard 48 and a mouse or other pointing device 50. If the display 46 is a touch screen such as that commonly used on tablet computers, personal digital assistants, and smartphones, a separate keyboard and/or mouse may not be required.

Also shown in FIG. 1 are two dispensing units 52 and 54. Each dispensing unit 52 and 54 is shown as including twelve separate dispensing bins 56a-56n. The dispensing units need not have the same number of dispensing bins. Likewise, the size and shape of the bins need not be the same. Some may be larger to accommodate laptop and tablet computers such as laptops 18-20 and table computers 10-12 and others may be smaller to store cell phones or smartphones 14-16.

Figure 3:
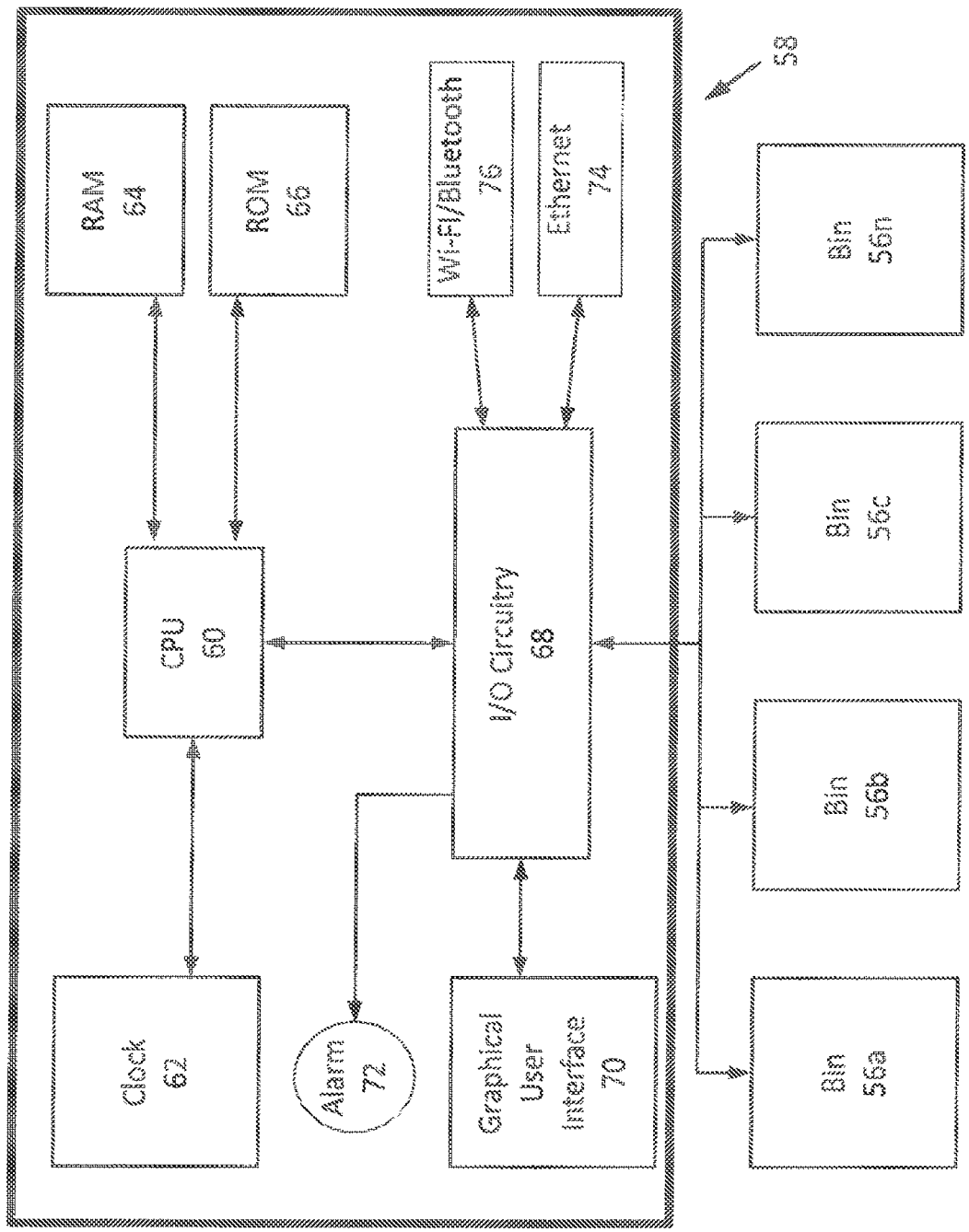
FIG. 3 is a schematic diagram of the dispensing unit controller of FIG. 1.

As shown in FIG. 3, each dispensing unit of FIG. 1 has a controller 58 comprising a CPU 60 coupled to a clock 62, RAM 64, ROM 66 and I/O circuitry 68. The I/O circuitry 68 is, in turn, coupled to a graphical user interface 70 comprising a separate display, pointing device and keyboard, or alternatively, a touch screen display. The I/O circuitry is also coupled to an alarm 72 and two separate communication devices which typically will include an Ethernet port 74 and a wireless communication unit 76. The wireless communications unit 76 may employ either or both Wi-Fi and Bluetooth protocols (or some suitable alternate protocol) for wireless communication with the portable electronic devices 10-20. The I/O circuitry of the dispensing unit is also coupled to a separate set of devices associated with each individual bin 56a-n. These devices are shown schematically in FIG. 4.

Figure 4:
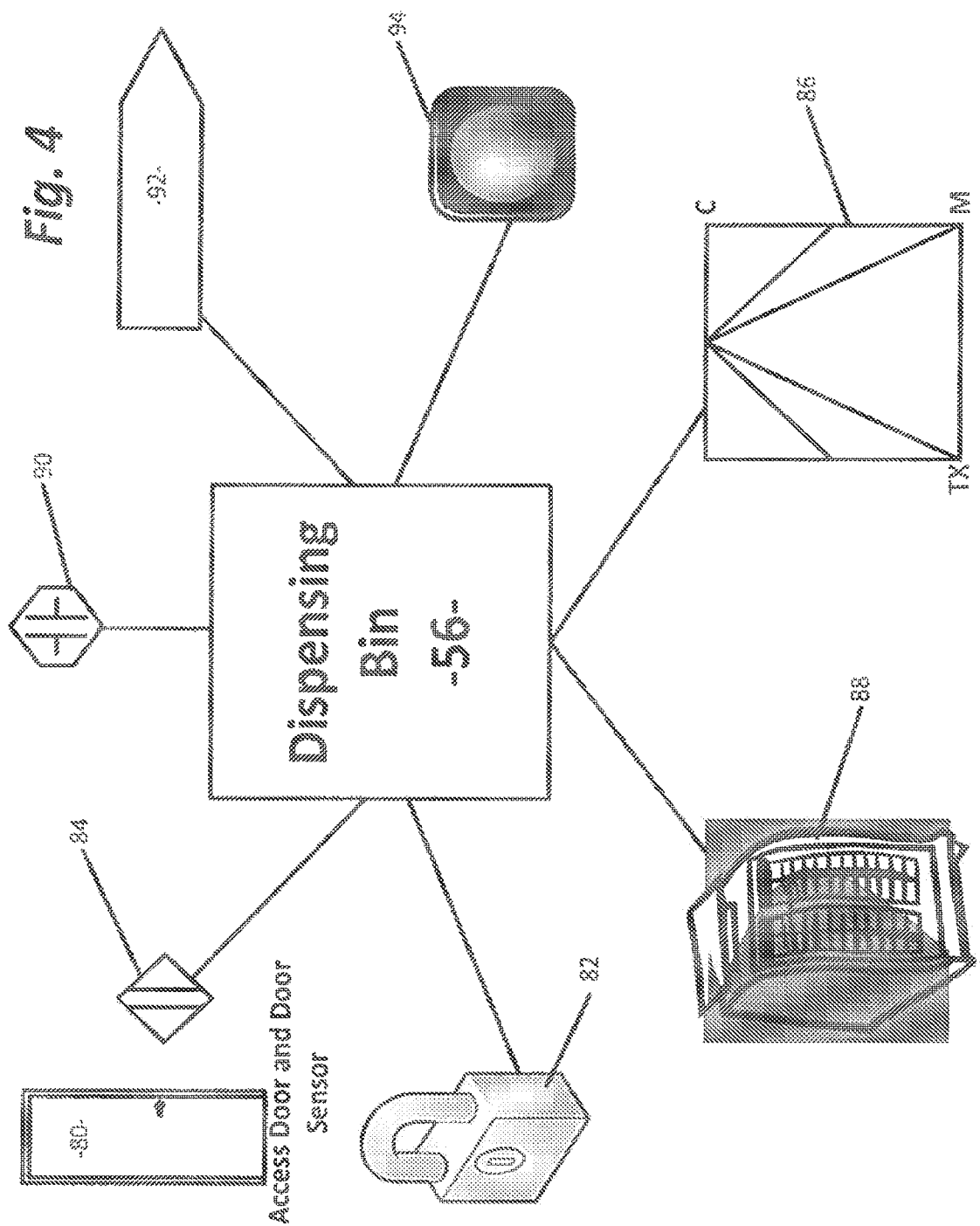
FIG. 4 is a schematic diagram illustrating the control and reporting structures associated with a dispensing bin of a dispensing unit shown in FIG. 1.

As illustrated in FIG. 4, each bin includes an access door 80 and an electronic door lock 82. The electronic door lock 82 is coupled to and controlled by controller 58 of FIG. 3. When the lock 82 is unlocked, the door 80 can be swung between opened and closed positions. A door sensor 84 senses the position of the door and sends signals indicative of the door's position to the controller 58.

An important aspect of the invention is the ability to monitor and control the contents of each bin 56a-n. This capability is enabled by providing three additional sensors for each bin 56a-n which are also coupled to controller 58. These sensors include a light sensor 86 which may be an electric eye or even a digital camera, a weight sensor 88 which sends signals indicative of the total weight of objects placed in the bin to the controller 58 and an identification sensor 90 which reads the identification tag of any portable electronic device placed in the bin.

Each bin also includes a battery charging/data port 92 which is coupled to the dock 42 of a portable electronic device 10-20 placed in the bin to charge the battery 40 of the portable electronic device and transfer data files between the portable electronic device and the controller 58 of the dispensing unit 52/54. Alternatively, an inductive battery charging unit could be employed to charge the battery 40 and the wireless communication device 44 of the portable communication devices and wireless communication device 76 of the dispensing unit could be employed to transfer data and files.

Each dispensing bin may also be provided with one or more indicator lights or a display 94. The indicator lights or display 94 may be employed to signal which bin an inmate should access, whether the bin is empty or contains a portable electronic device, whether the door is open or closed, whether the lock is locked or unlocked, the charge state of a portable electronic device located within the bin, whether the portable electronic device has completed an inmate-specific set-up process and is ready for use by that inmate, whether the contents of that particular bin triggered an alarm, or any other information which may be useful to inmates, maintenance staff or security personnel.

Returning to FIG. 1, ultimate control of the operation of the dispensing units 52 and 54 and the portable electronic devices 10-20 resides with a server 100. The server 100 is coupled to a switch 101 which is also coupled to each of the dispensing units 52 and 54 via CATS or some other suitable cable to provide an Ethernet connection. Likewise, the switch 101 is shown as coupled to an administrative workstation 102 which may be a dumb terminal providing a user interface for operation of the server 100 or a personal computer. Additional administrative and monitoring workstations may also be coupled to the server 100 via switch 101. The server 100 is also coupled to a router 103 and from the router 103 the Internet 104. An important feature of the invention is a database stored in a data storage device 126 coupled to server 100. The types of tables and data included in the database will be discussed below with reference to FIGS. 8-10.

Figure 5:
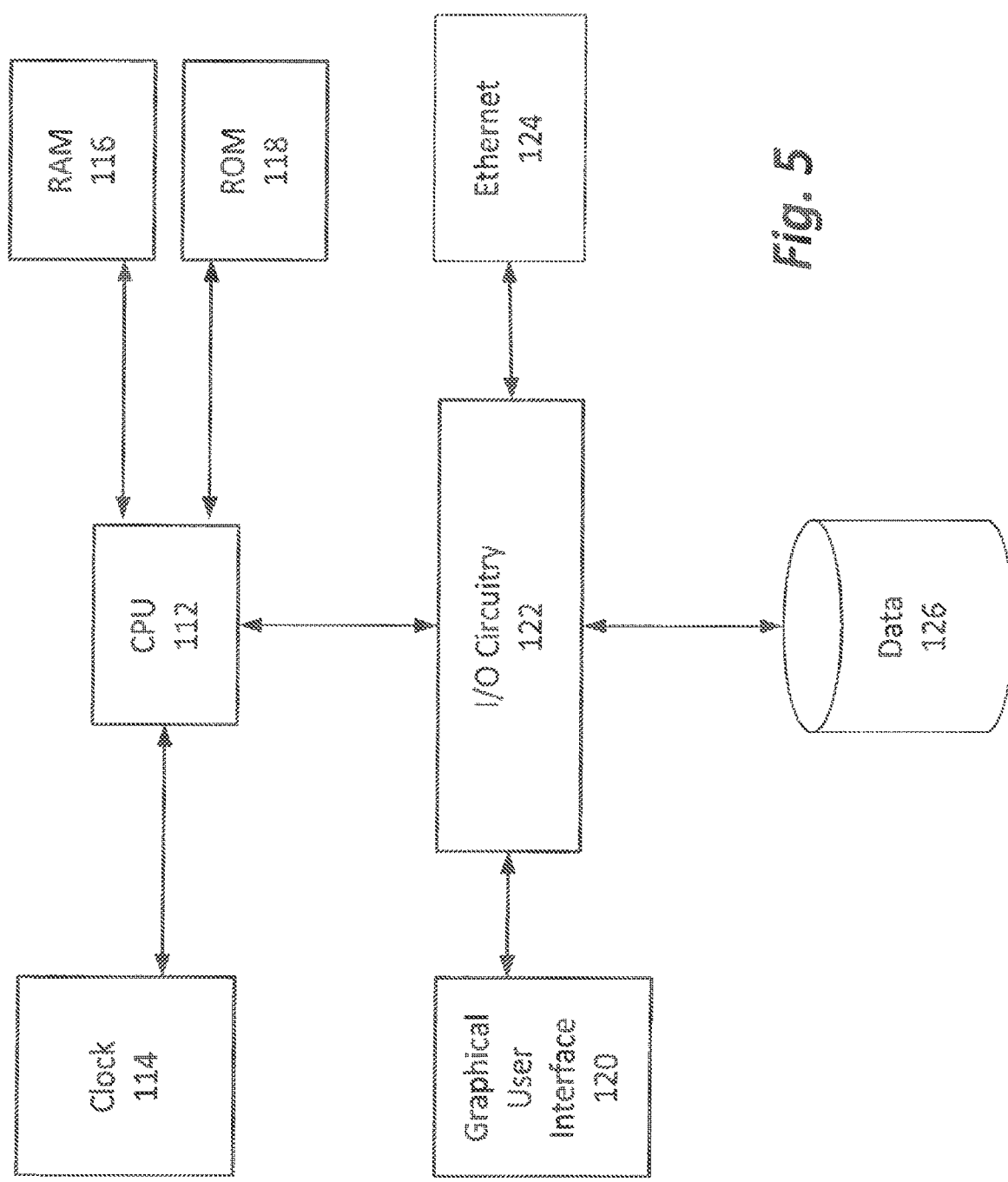
FIG. 5 is a schematic diagram of the server shown in FIG. 1.

FIG. 5 shows the main components of the server 100. The server 100 includes a CPU 112, a clock 114, RAM 116, ROM 118, a graphical user interface 120 (e.g., a keyboard, mouse and display), I/O circuitry 122, an Ethernet port 124 and a data store 126 for storing the aforementioned database.

Figure 6:
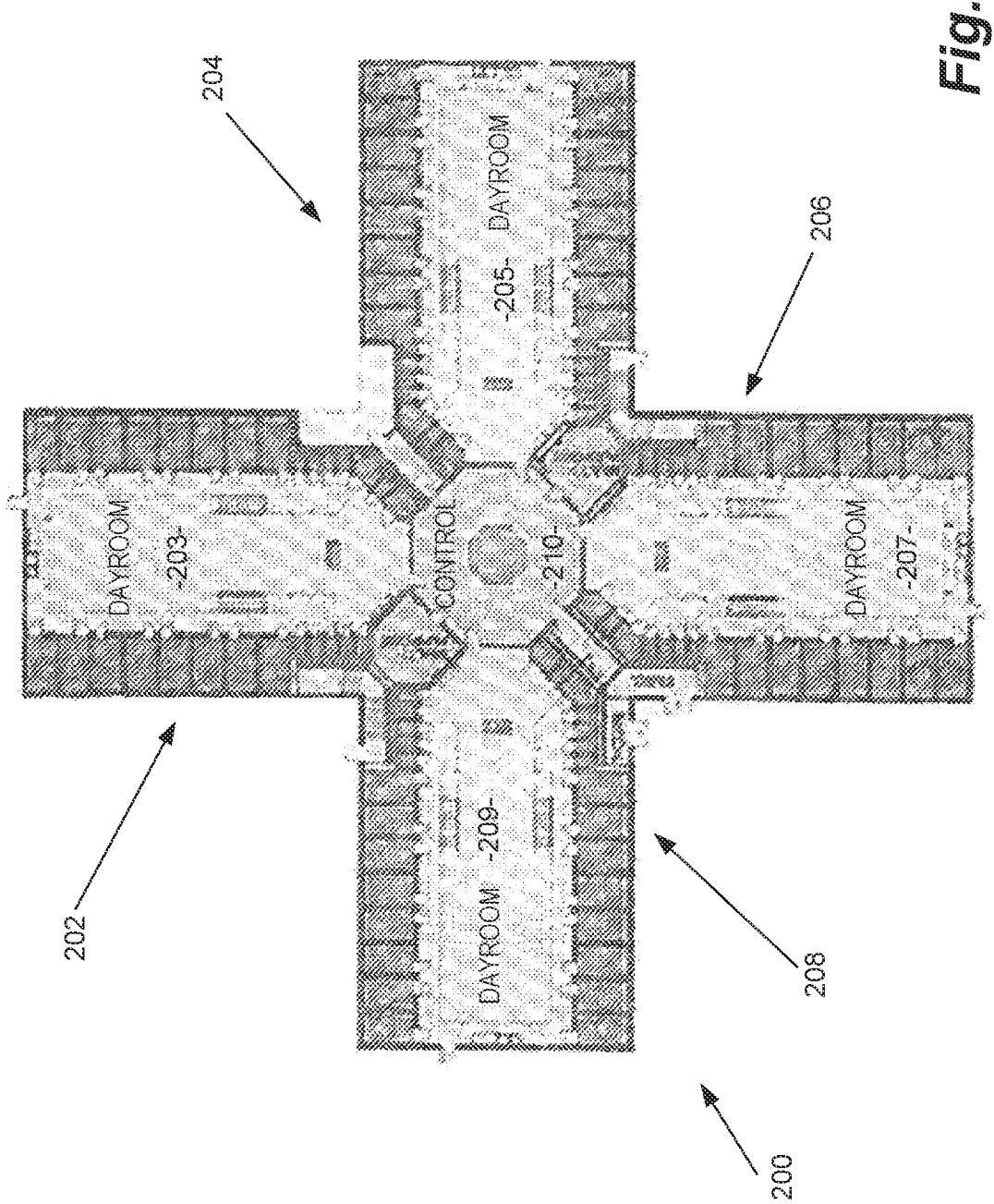
FIG. 6 is an exemplary floor plan of a penal institution.

FIG. 6 shows an exemplary floor plan of a prison or other penal institution 200. As illustrated, the penal institution 200 includes four separate cell blocks 202, 204, 206 and 208 which may alternatively be referred to as houses, units or the like. Each of the cell blocks comprises a plurality of cells, bathrooms and other facilities and a day room 203, 205, 207 and 209. A control room 210 is centrally located and has doors for directly accessing the day room of each cell block and observation windows permitting guards located in the control room 210 to view and monitor the activities of each cell block. When the present invention is employed, one or more of the dispensing units 52/54 will be installed in each of the day rooms 203-209 and coupled to the server 100 which may be conveniently located in the control room 210. Likewise, the switch 101, router 103 and administrative workstations 102 may be located within the control room 210 so that prison employees can control and monitor dispensing of items to prisoners housed in each of the cell blocks 202-209. Of course, larger penal institutions may comprise multiple buildings or multiple floors of a single building arranged as exemplified in FIG. 6 or in some other suitable configuration. In such cases, a single server 100, router 103 and switch 101 may be employed for all such buildings or floors and separate workstations 102 installed in each control room 210 for use by prison employees to monitor and control dispensing with respect to a specific group of dispensers 52/54.

Figure 7:
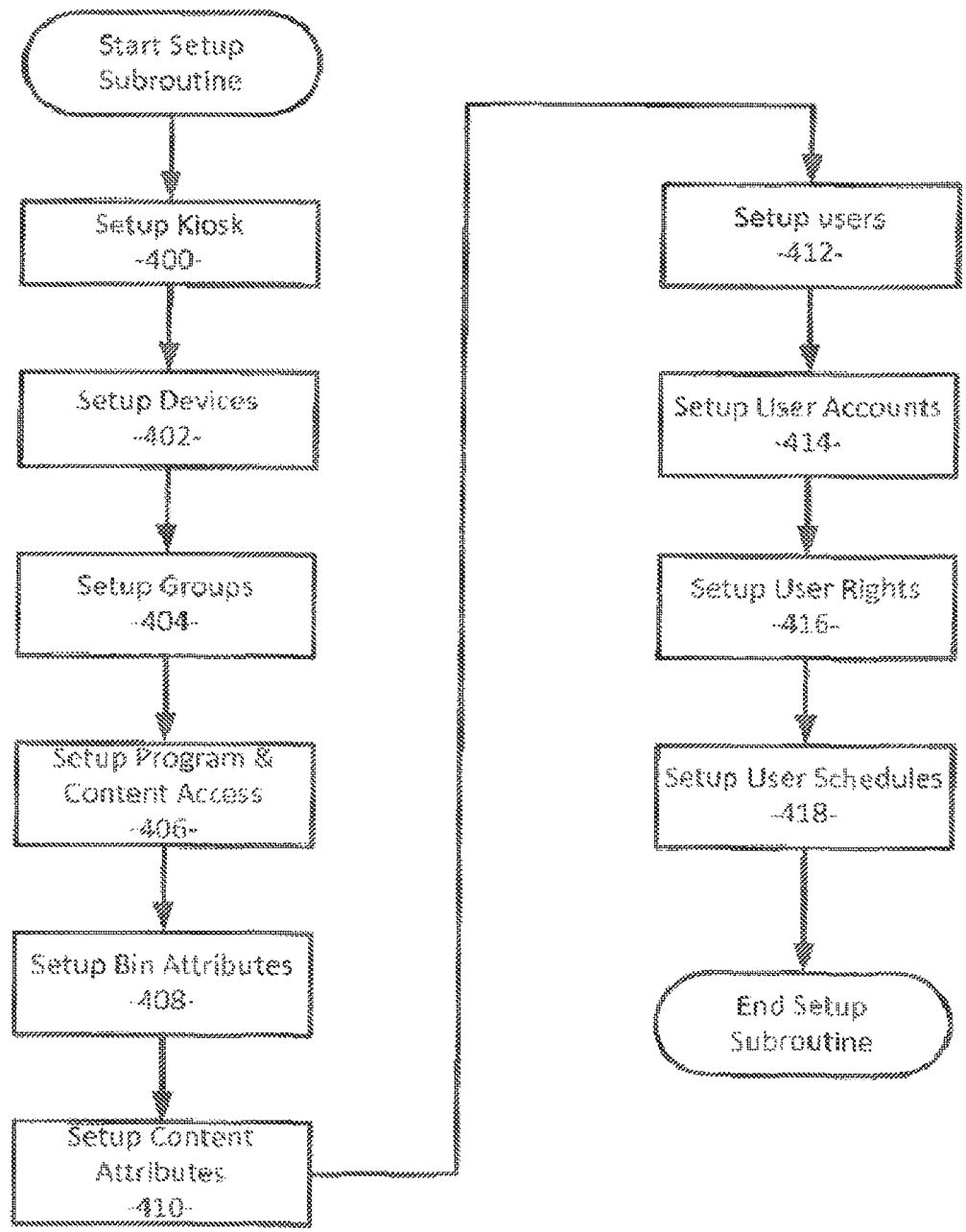
FIG. 7 is a flow chart showing the set-up subroutine of the program which controls the services of FIG. 1.
Figure 8:
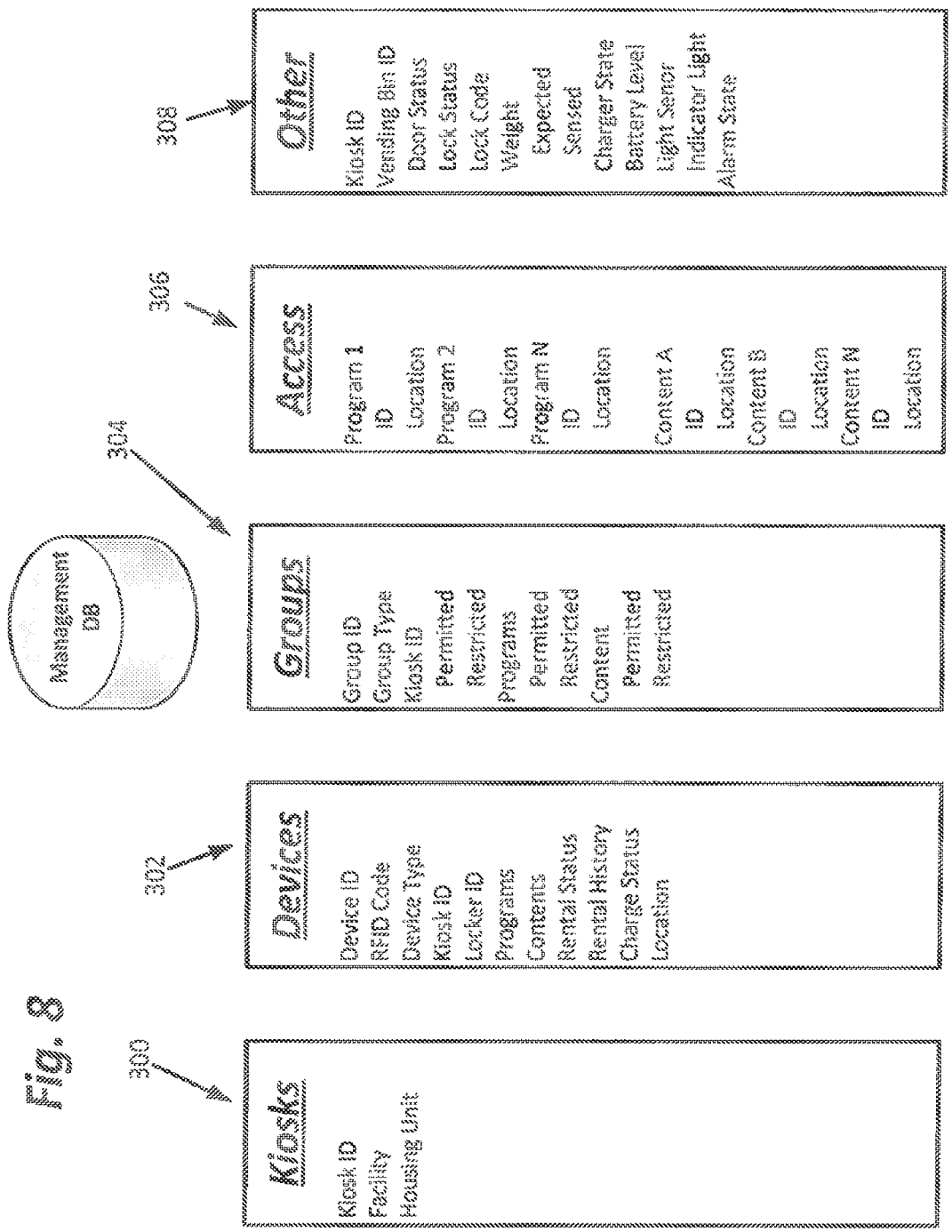
FIG. 8 is a chart showing the data tables in the management portion of the database of FIG. 1.

The database stored in datastore 126 of the present invention includes a set of management tables such as those shown in FIG. 8. Many of the fields contained in these tables are completed using a set-up routine of the control software. A flow chart showing an exemplary set-up routine is illustrated in FIG. 7.

As shown in FIG. 7, the first step 400 in the set-up process is to collect certain information related to the dispensers 52/54 which may also be referred to as kiosks. First, each kiosk is assigned an ID which may be an address assigned to the controller 58 of a specific dispenser. More specifically and by way of example, dispenser 52 will have a unique and different kiosk ID than dispenser 54. The kiosk ID of each dispenser 52/54, together with a facility ID and housing unit ID which define the location of each kiosk, are stored together in the kiosk table 300 as shown in FIG. 7.

At step 402 in FIG. 8, portable electronic devices 10-20 are assigned to the specific dispensers from which such devices will be dispensed. An example of the data collected during step 402 is shown as being stored in the devices table 302 of FIG. 8. Specifically, the unique electronic address of each such devices is recorded and stored together with the unique code which emanates from the RFID tag 22 attached to that devices. This data is associated with not only the kiosk ID of the dispenser 52/54 to which the specific electronic portable device will be used and is assigned, but also a locker ID identifying the specific locker or bin 56a-n of the dispenser 52/54 to which the portable electronic device is assigned. For example, device 16 may be assigned to locker or bin 56d of dispenser 54 and this is all recorded in the devices table 302 of the database 126.

Additionally, the devices table 302 may contain data further identifying the nature of the device in the device type field. Separate codes may be used to distinguish between tablet computers such as 10 and 12, cell phones such as 14 and 16 and laptop computers such as 18 and 20. The devices table 302 is also used to record information about the programs installed on a specific portable electronic devices 10-20 and other content loaded onto the device (e.g., articles, books, movies, music, television shows and the like). As will be explained in greater detail below, devices table 302 also is used to store status and history information about the devices.

In most prison environments, prisoners are grouped for administrative and security purposes. Further, different groups of prisoners are sometimes afforded privileges not afforded to other prisoners. During setup step 404 of FIG. 7, different groups and rights and privileges of such groups are identified and relevant information is stored in the groups table 304 shown in FIG. 8. For example, a group might be all prisoners housed in cell block 202 and another group may be all prisoners housed in cell block 204. Each group is assigned a group ID which is stored in table 304. Each group is also assigned a group type code also stored in table 304. For example, different codes may be used to designate the level of security of the group, e.g., minimum security or maximum security. Each group is also associated with one or more kiosks such that members of the group are only permitted to use, or are restricted from using, a particular dispenser or kiosk 52 or 54 or set of dispensers. Similarly, group members may be permitted to use or be restricted from using certain programs or content.

For example, cell block 202 may be a minimum security facility and have kiosk 52 located therein. The prisoners are given access to kiosk 52. A wide array of programs and content are made available to that group of prisoners via the portable electronic devices dispensed from dispenser 52. On the other hand, cell block 204 may be a maximum security facility having kiosk 54 located therein. The group of prisoners located in cell block 204 might only be given access to commissary, library and grievance programs and content. That group of prisoners may also be restricted from having access to a wider range of books, e-mail, telephonic and entertainment programs and content. All of this group-related information is stored in groups table 304 of FIG. 8.

To provide further control over access, all programs and content made available using the system is assigned a unique description, ID and storage location. This data is stored in table 306 during step 406 of the set-up process.

A significant contributor to the security achieved by the present invention is the ability to monitor the status of each vending bin of each kiosk. The bin attribute information necessary to do so is stored in the "other" table 308 at step 408. Certain information is stored in this table during the set-up process, but most of the data in this table is collected and stored during use. During set-up, the kiosk ID or address and vending bin ID or address is stored for each bin. Also, once a device 10-20 is assigned to the bin, an expected weight is stored. This is compared to the actual weight received from the bin's weight sensor 88 to help ensure no unauthorized items are placed in the bin or items have not been removed from the portable electronic device.

Figure 9:
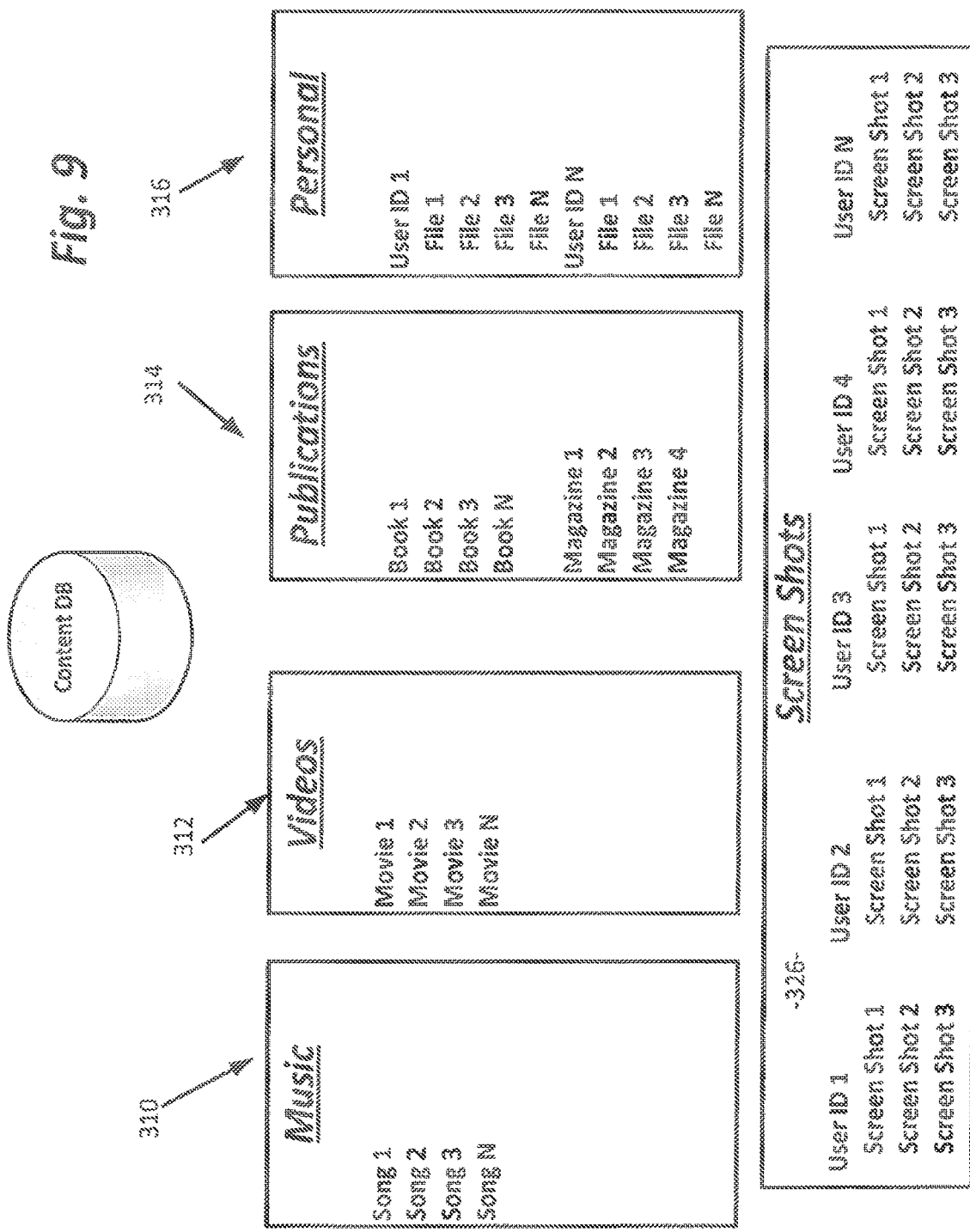
FIG. 9 is a chart showing the data tables in the content portion of the database of FIG. 1.

As noted above, each program and item of content is assigned an ID and storage location. Further information related to content is stored in tables 310-316, examples of which are illustrated in FIG. 9. These tables are populated at step 410 of the set-up process. Table 310 identifies music (or music subscriptions) which may be accessed in a controlled fashion using the portable electronic devices. In a similar fashion, table 312 does so for video content such as movies and television shows and table 311 does so for publications such as books, articles, legal decisions or the like. Prisoners are also permitted to create content of their own (e.g., letters, e-mails, grievances, commissary orders, etc.). This content is also stored in the datastore 126 and indexed in table 316 of the database. As such, tables 310-316 provide an index of all content available for one or more prisoners to access.

Figure 10:
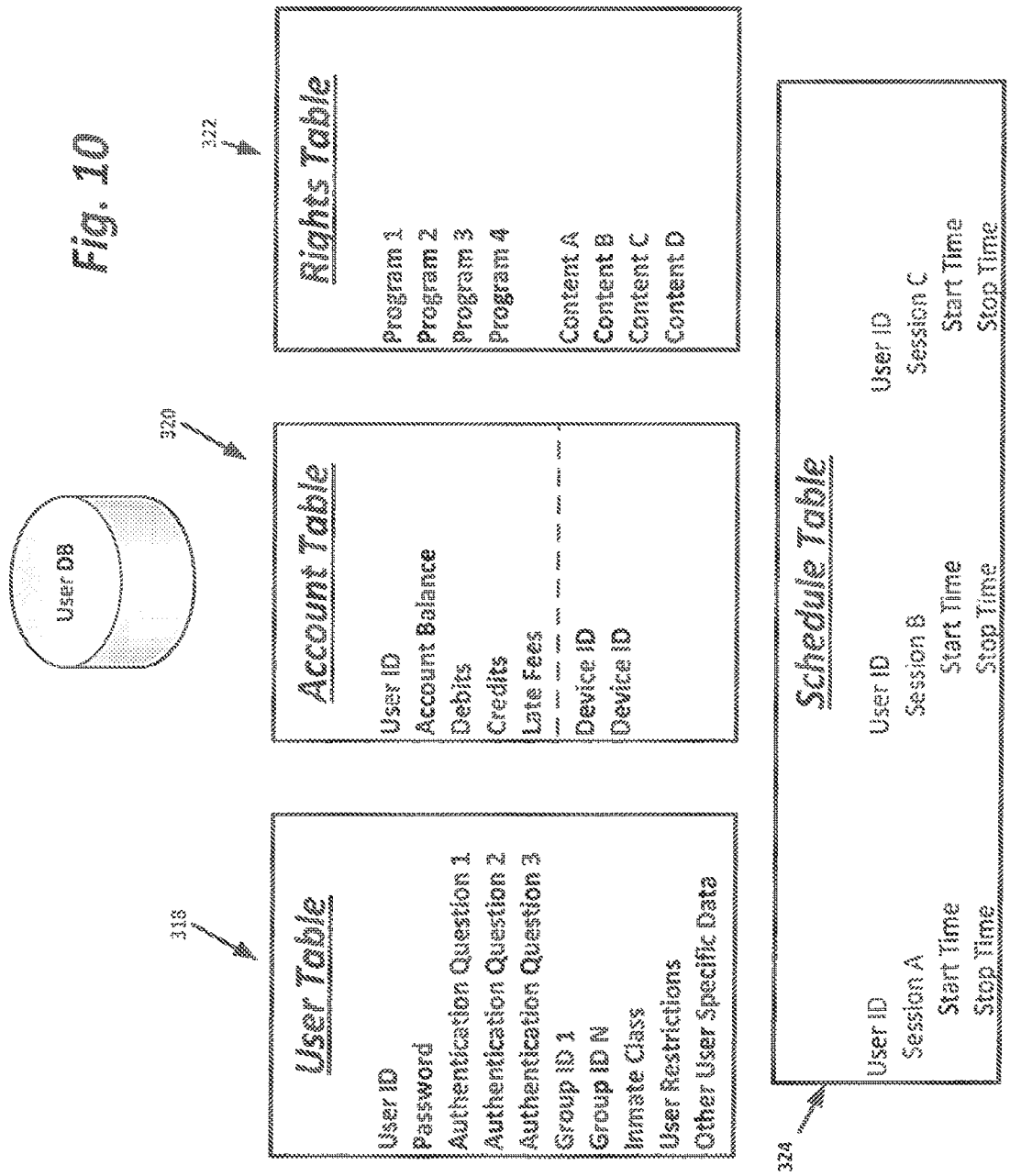
FIG. 10 is a chart showing the data tables of the user portion of the database of FIG. 1.

The set-up process also requires data to be entered for each user of the system including each prisoner. Examples of table where user data related to each prisoner are stored are shown in FIG. 10. At step 412 of FIG. 7, each user is assigned a unique user ID and password. Each prisoner is also asked to provide answers to several authentication questions. This information is stored in the user table 318.

Also stored in the user table 318 is an identification of each group to which the specific user belongs. Each user may also be assigned an inmate classification. User access restrictions may also be entered at step 412 and stored in table 318. Such restrictions may relate to specific types of portable electronic devices 10-20 a user is permitted to use. For example, a user may be permitted to use a tablet computer, but restricted from using a cell phone. Such restrictions may also relate to programs and content the user may access or the number of hours the prisoner may have access to portable electronic devices. Other user specific data such as the prisoner's sex, age, height, weight, hair color, skin color, religion, criminal history or the like may also be entered here. Such user-specific data may also include a list of phone numbers or e-mail addresses the specific inmate may call or send messages to which may be limited to, for example, the telephone numbers and e-mail addresses of the inmate's lawyer, spouse and/or other designated relatives.

During the set-up process at step 414, an account is created for each inmate so that the inmate may be charged for use of the portable electronic devices, commissary or entertainment purchases and certain other services employed and content accessed using the portable electronic devices without the need to use cash or a credit card. The account data is stored in the account table 320. More specifically, the account table 320 is populated with each user's ID together with each user's available account balance. As the user makes use of the system, debits and credits are recorded in this table together with any late fees incurred by failing to return the portable electronic device on time. In some cases, an inmate will own one or more of the portable electronic devices used with the system. In such cases, the inmate's account is set up to indicate the inmate is the owner of the specific devices and should not be charged for use of such devices. The "Device ID" of each such device is recorded in the account table 320.

The system of the present invention not only permits rights and restrictions concerning programs and content to be assigned at the group level, but also at the individual user level. The specific user's rights and restrictions, which may differ from the rights and restrictions generally related to a group to which the user belongs, are recorded in the rights table 322 during step 416.

The system of the present invention may also be used to establish individual schedules for each user. Data related to scheduling is recorded in table 324 during set-up step 418. The schedule may be as simple as defining the times during which the user may have access to the portable electronic devices 10-20. The schedule may be further refined to permit access to tablet computers 10-12 during certain periods, cell phones 14-16 during other periods and laptops 18-20 during still other periods. Likewise, schedules may be refined to permit access to certain programs (e.g., commissary, grievance and law library) during longer periods than access to other programs (e.g., telephone and entertainment). In a similar fashion, schedules can be created to give certain inmates access to specific items of content during specific periods of time. For example, if an inmate rents a movie for viewing, the schedule may only permit viewing during a specific, short window of time.

Finally, table 326 (see FIG. 9) is partially populated at the same time as table 318 of FIG. 10. Specifically, as each user ID is created, the user is added to table 326. As explained more fully below, table 326 plays an important role in the overall security of the system.

While FIG. 7 shows a specific sequence for carrying out the set-up process, the routine can be varied as desired. Likewise, the software can be written to allow prison employees to branch to particular processes or steps as needed such as when new prisoners, groups or content offerings are added or data related to a particular dispenser, bin, inmate, group, program or content needs to be altered or added.

Figure 11:
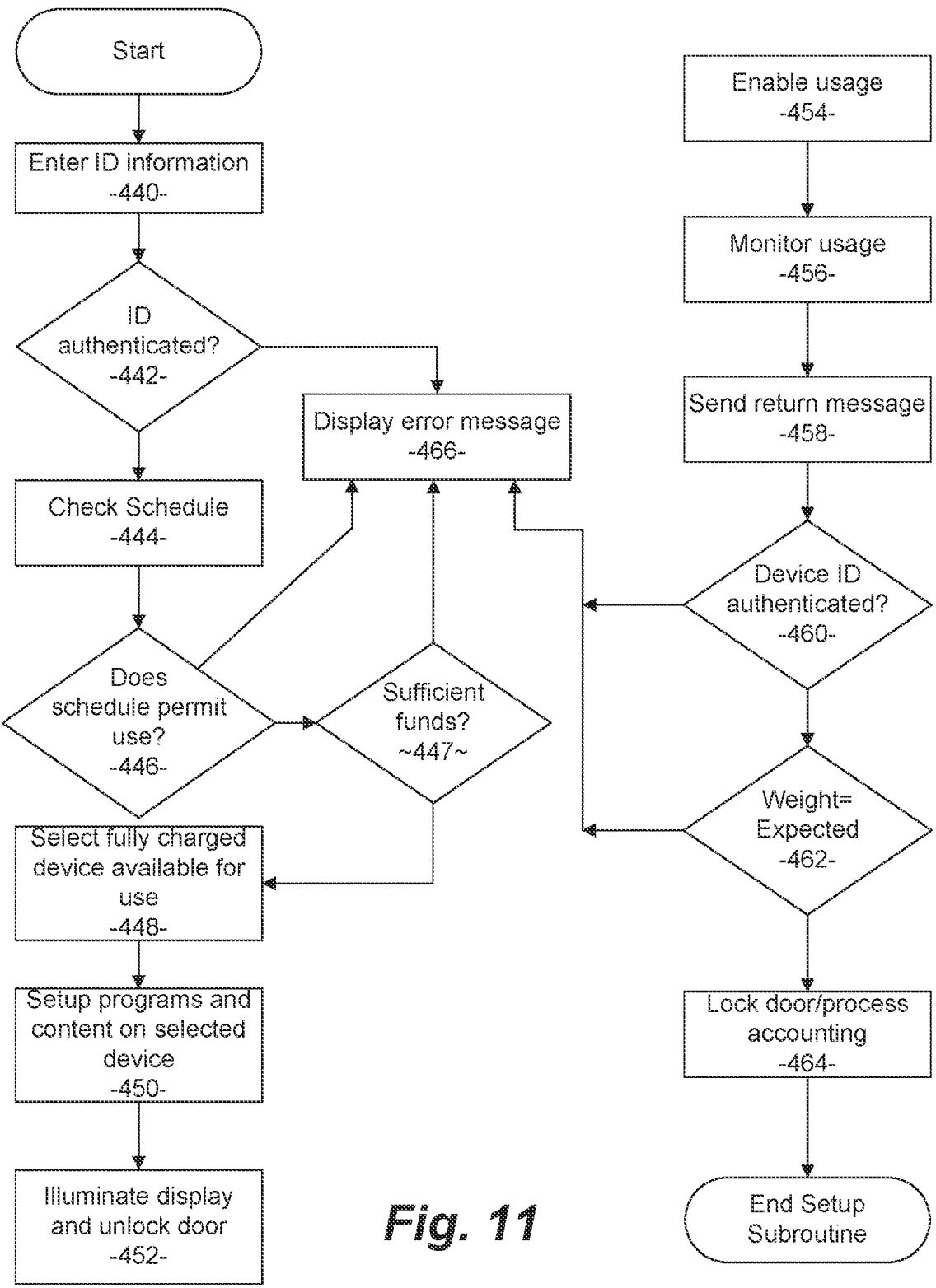
FIG. 11 is a flow chart showing the security check subroutine of the program which controls the server and portable electronic devices of FIG. 1.

The system is ready for use once setup is complete, the dispensers 52 and 54 are installed and connected via the switch 101 to the server 100, and the portable electronic devices 10-20 are positioned, as assigned, in the correct bin 56a-n of the correct dispenser. FIG. 11 is a flow chart showing how the system may be used.

Operation begins at step 440 in FIG. 11 when an inmate approaches a dispenser 52/54. Using the graphical user interface of the dispenser's controller 58, the inmate supplies identification information. This may be a user name, password and responses to authentication questions. Alternatively, this may be a fingerprint or retinal scan. To employ this alternative arrangement, the user interface of the dispenser must have a suitable scanner and a reference scan file should be stored in the database and referenced to the inmate in table 318 of FIG. 10. At step 442, the entered information is compared to data in table 318 of FIG. 10 (or reference scan file) to see if there is a match. If any error occurs such that the identification information entered by the inmate does not match the contents of table 318, then the program branches to step 466 and error messages are sent not only to the graphical user interface of the controller 58 of the dispenser 52/54, but also to a workstation 102 so a prison employee is alerted and can monitor and address the situation. This also will occur if an inmate attempts to gain access to a dispenser 52/54 or bin 56a-n which the inmate is not authorized to access. If there is a match, the program proceeds to step 444.

At steps 444 and 446, schedule information related to the inmate is checked. Specifically, the server 100 checks table 324 to see if the inmate is then scheduled to use a portable electronic device. If such use at that time is not authorized, the program again branches to step 466 and appropriate error messages are generated. If the inmate is, in fact, scheduled to use a portable electronic device, a check of the data related to the inmate in table 320 of FIG. 10 is made at step 447 to see if funds are required for the proposed use and if the inmate has the required funds necessary for the proposed use. Of course, some services are offered without charge (e.g., use of a law library, filing of a grievance) while other uses are only permitted if the inmate has sufficient funds in his or her account. If there are insufficient funds, error messages are again generated. Otherwise, the program branches to step 448.

At step 448, the program identifies a fully charged device available for use using data in either table 302 or 308 and, at step 450, the program adjusts the device by installing, uninstalling, locking or unlocking programs and content on the device to match the inmate's rights and restrictions as listed in tables 304, 306, and 322. Once this step is complete, the door to the appropriate bin is unlocked and a visual indication of which bin should be accessed is provided at the dispenser. More specifically, at step 452 the lock 82 of a specific bin is unlocked so the door 80 of the bin may be opened to access the portable electronic device stored therein. Simultaneously, the light or display 94 associated with that specific bin is illuminated.

At step 454, usage of the device is enabled and monitoring of such usage begins at step 456. While s portable electronic device is in use, programs, data and other signals are exchanged between the server 100 and a portable electronic device via the dispenser associated with the device. Specifically, signals are transferred between the server and dispenser using the Ethernet connection between port 74 of the dispenser and 124 of the server. Signals are transferred between the dispenser and the portable electronic device via the wireless communicators 76 and 44. The server 100 also acts as a traffic cop monitoring and controlling communications via the router 103 between the portable electronic devices and the Internet 104. These same communication structures provide a vehicle for transmitting data between the server and the portable electronic devices during use. Content and programs can be transmitted back and forth during use. Likewise, communications between the Internet 104 and a portable electronic device 10-20 can follow this path. As explained above, the router 103 is controlled by the server 100 to prohibit unauthorized communications with the outside and to monitor communications with the Internet 104 which may be authorized.

Real-time monitoring can occur using workstation 102. Further, a screen shot of the display of the portable electronic device is made periodically, e.g., every 30 seconds and saved as a file. These files are indexed in table 326 such that an accurate archive of usage of the device is maintained.

Periodically, the system will send messages to the portable electronic device and to the workstation 102 alerting of the time by which the device must be returned. If the device is not returned on time, the device is rendered useless via a signal sent by the server 100 (or workstation 102) to the portable electronic device via the wireless communicating device 76 of the dispenser and wireless communications device 44 of the portable electronic device. When the inmate returns a portable electronic device to the dispenser, the user interface of the device or the dispenser will instruct the inmate. Specifically, such instructions include the identification of the specific dispenser 52/54 and specific bin 56a-n into which the portable electronic device is to be placed. Using the light sensor or camera sensor 86, the system determines at step 460 whether a device has been placed within the correct bin. Using the tag reader 90, the system determines whether the correct device has been placed in the correct bin. Using the weight sensor 88, the system determines whether any unauthorized items have been added to or removed from the portable electronic device. This is done at step 462 by sensing the total weight of item(s) in the bin and comparing the sensed weight to the expected weight recorded in table 308 of FIG. 8. Doing so is important to ensure no contraband is transferred from one inmate to another using the bins 56a-n and to ensure nothing has been removed from the personal electronic device which would hinder its operation or which might even be used to create a weapon or other tool. If any error is detected during either steps 460 or 462, error messages are sent to the graphical interface of the controller 58 of the dispenser 52/54 and to the workstation 102.

Additional steps of the return process will typically require the inmate to dock the portable electronic device (e.g., 10) to the docking port 92 of the dispensing bin and then close the door 80 of the dispensing bin. Only when the server 100 is able to confirm that (1) the proper portable electronic device (e.g., 10) has been placed in the bin (e.g., 56f of dispenser 52); (2) no parts are missing; (3) no additional items have been placed in the bin; (4) the portable electronic device is properly docked so the battery can be recharged and data can be transferred; and (5) the door 80 of the bin is closed, will the device be deemed "returned". At step 464, the lock 82 of door 80 is locked and the accounting information in table 320 is updated to reflect any usage and other charges and late fees the inmate may have occurred.

After a portable electronic device is returned, the device will be processed for future use by other inmates. Typically, the battery will be charged and the device will be reset to delete certain data, programs and files stored in the memory of the device during the earlier inmate's use. The server can then poll the schedule information in the database to determine which inmate will be next to use the portable electronic device and prepare the device for use by locking, unlocking, installing and uninstalling programs, files and data in accordance with rights and restrictions associated with the next inmate to use the device.

Those skilled in the art will recognize that certain steps outlined above may be deleted, rearranged or altered and additional steps may be employed without deviating from the invention.

This invention has been described he in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An electronic device dispensing system comprising:
    a memory;
    at least one processor coupled to the memory and configured to:
        retrieve, from a database, schedule information of a user based on a request of the user; and
        determine, based on the schedule information, that the user is scheduled to use a first type of electronic device; and
    a container coupled to an indicator and configured to:
        dispense the electronic device of the first type,
        wherein the schedule information indicates a first time period that the user is allowed to use the first type of electronic device and a second time period that the user is allowed to use a second type of electronic device.

2. The electronic device dispensing system of claim 1, wherein the at least one processor is further configured to:
    receive the request from the user to access the first type of electronic device.

3. The electronic device dispensing system of claim 1, wherein the at least one processor is further configured to:
    query, based on the request, the database to retrieve rights and restrictions of the user; and
    determine, based on the rights and restrictions of the user, that the first type of electronic device is allowed for the user.

4. The electronic device dispensing system of claim 1, wherein the first type of electronic device is a tablet computer and the second type of electronic device is a cell phone.

5. The electronic device dispensing system of claim 1, wherein the at least one processor is further configured to:
    receive a second request from the user to access the second type of electronic device;
    determine a current time;
    determine, based on the schedule information of the user, that the user is restricted to use the second type of electronic device at the current time; and
    display an error message.

6. The electronic device dispensing system of claim 1, wherein the schedule information indicates a first time period that the user is allowed to use a first type of programs and a second time period that the user is allowed to use a second type of programs.

7. The electronic device dispensing system of claim 1, wherein the at least one processor is further configured to:
    determine, based on the schedule information of the user, that the user is scheduled to use the electronic device of the first type and a first type of programs prior to receiving the request;
    uninstall programs of a second type from the electronic device of the first type;
    install the programs of the first type into the electronic device of the first type; and
    secure the electronic device of the first type.

8. A method of an electronic device dispensing system, the method comprising:
    retrieving, from a database, schedule information of a user based on a request of the user;
    determining, based on the schedule information, that the user is scheduled to use a first type of electronic device; and
    dispensing the electronic device of the first type,
    wherein the schedule information indicates a first time period that the user is allowed to use the first type of electronic device and a second time period that the user is allowed to use a second type of electronic device.

9. The method of the electronic device dispensing system of claim 8, further comprising receiving the request from the user to access the first type of electronic device.

10. The method of the electronic device dispensing system of claim 8, further comprising:
    querying, based on the request, the database to retrieve rights and restrictions of the user; and
    determining, based on the rights and restrictions of the user, that the first type of electronic device is allowed for the user.

11. The method of the electronic device dispensing system of claim 8, wherein the first type of electronic device is a tablet computer and the second type of electronic device is a cell phone.

12. The method of the electronic device dispensing system of claim 8, further comprising:
    receiving a second request from the user to access the second type of electronic device;
    determining a current time;
    determining, based on the schedule information of the user, that the user is restricted to use the second type of electronic device at the current time; and
    displaying an error message.

13. The method of the electronic device dispensing system of claim 8, wherein the schedule information indicates a first time period that the user is allowed to use a first type of programs and a second time period that the user is allowed to use a second type of programs.

14. The method of the electronic device dispensing system of claim 8, further comprising:
    determining, based on the schedule information of the user, that the user is scheduled to use the electronic device of the first type and a first type of programs prior to receiving the request;
    uninstalling programs of a second type from the electronic device of the first type;
    installing the programs of the first type into the electronic device of the first type; and
    securing the electronic device of the first type.

15. A non-transitory computer-readable device having instructions stored thereon that, when executed by at least one computing device, cause the at least one computing device to perform operations comprising:
    retrieving, from a database, schedule information of a user based on a request of the user;
    determining, based on the schedule information, that the user is scheduled to use a first type of electronic device; and
    dispensing the electronic device of the first type,
    wherein the schedule information indicates a first time period that the user is allowed to use a first type of programs and a second time period that the user is allowed to use a second type of programs.

16. The non-transitory computer-readable device of claim 15, wherein the operations further comprise receiving the request from the user to access the first type of electronic device.

17. The non-transitory computer-readable device of claim 15, wherein the operations further comprise:
   querying, based on the request, the database to retrieve rights and restrictions of the user; and
   determining, based on the rights and restrictions of the user, that the first type of electronic device is allowed for the user.

18. The non-transitory computer-readable device of claim 15, wherein the first type of electronic device is a tablet computer and the second type of electronic device is a cell phone.

19. The non-transitory computer-readable device of claim 15, wherein the operations further comprise:
   receiving a second request from the user to access a second type of electronic device;
   determining a current time;
   determining, based on the schedule information of the user, that the user is restricted to use the second type of electronic device at the current time; and
   displaying an error message.

20. The non-transitory computer-readable device of claim 15, wherein the operations further comprising:
   determining, based on the schedule information of the user, that the user is scheduled to use the electronic device of the first type and the first type of programs prior to receiving the request;
   uninstalling programs of the second type of programs from the electronic device of the first type;
   installing programs of the first type into the electronic device of the first type; and
   securing the electronic device of the first type.

* * * * *